June 23, 1936.　　　H. W. NEPO　　　2,045,022

SAFETY MOTION PICTURE PROJECTOR

Filed Sept. 18, 1933　　　3 Sheets-Sheet 1

Witnesses:
C. E. Wessels
Austa E. Nelson

Inventor:
Harry W. Nepo,
By Joshua R. H. Potts
His Attorney.

June 23, 1936. H. W. NEPO 2,045,022
SAFETY MOTION PICTURE PROJECTOR
Filed Sept. 18, 1933 3 Sheets-Sheet 2

Witnesses:
E. E. Wheels.
Aasta E. Matson

Inventor:
Harry W. Nepo,
By Joshua R. H. Potts
his Attorney.

June 23, 1936.  H. W. NEPO  2,045,022
SAFETY MOTION PICTURE PROJECTOR
Filed Sept. 18, 1933   3 Sheets-Sheet 3
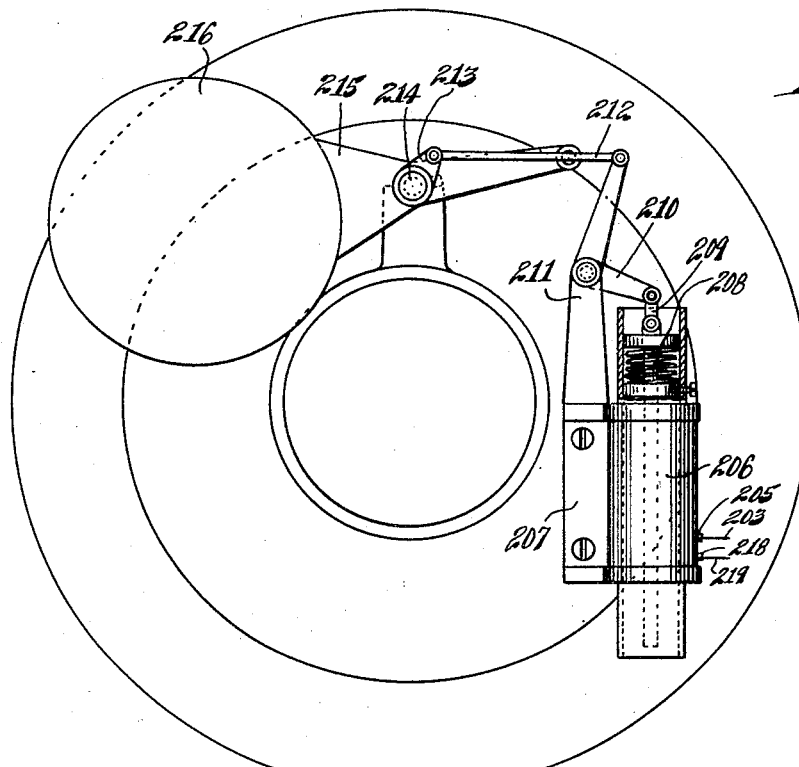
Fig. 3.
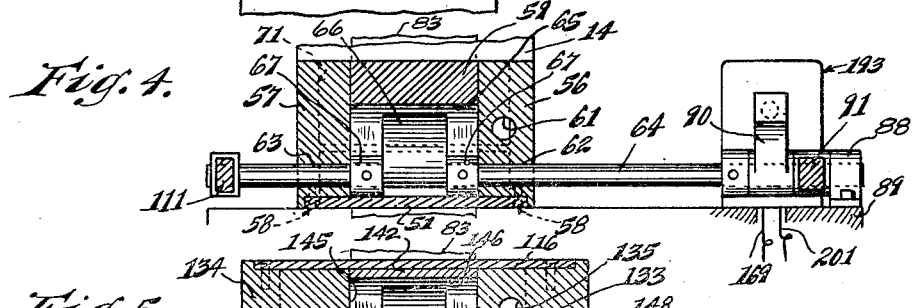
Fig. 4.
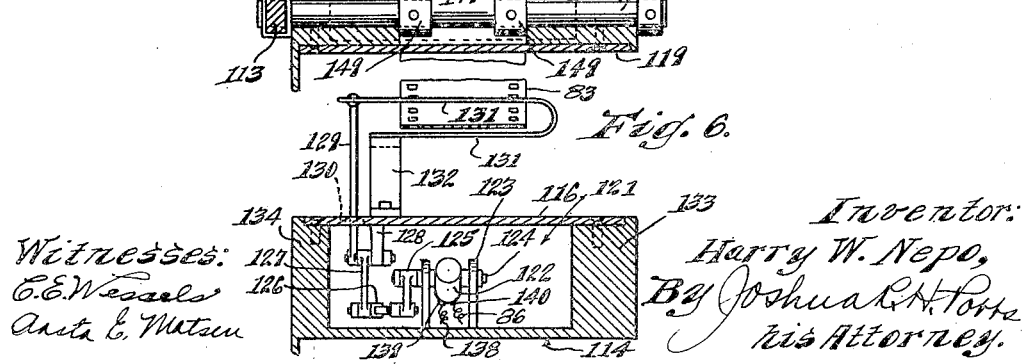
Fig. 5.
Fig. 6.
Witnesses:
C. E. Wessels
Anita E. Matsen
Inventor:
Harry W. Nepo,
By Joshua R. H. Potts
his Attorney.

Patented June 23, 1936

2,045,022

UNITED STATES PATENT OFFICE 2,045,022

SAFETY MOTION PICTURE PROJECTOR

Harry W. Nepo, Chicago, Ill.

Application September 18, 1933, Serial No. 689,816

7 Claims. (Cl. 88—17)

My invention relates to safety motion picture projectors and has for an object the perfection of the motion picture projector which will be safe in operation and will reduce the fire hazard.

As it is well known the arc lights employed in motion picture projectors generate a ray of terrific heat when used in conjunction with the customary condensing lenses now employed. The ray of some popular types of projectors is 900 degrees Fahrenheit at the aperture plate, and consequently any stoppage of the film in this location is likely to cause the ignition of the film. It is now customary to employ a separate circuit for the arc light and a separate circuit for the driving mechanism of the projector. The reason for this lies in the fact that it takes a considerable amount of time for the arc light to become sufficiently warm for proper operation. If this were not the case the changing of a roll of film would entail a long delay until the arc light had been returned to proper working condition. If the circuit which drives the driving mechanism becomes disabled, the film will be stopped but the beam from the arc light will continue to shine through the film. If this continues for any length of time the film will be ignited, and the fire will spread to the roll contained in the feeding magazine. If a belt on the feeding or take-up mechanism should become broken, the same result would follow, and the main object of my invention is to eliminate the dangers caused by these difficulties.

Sometimes the film is broken during projection and of course accumulates within the projector housing while the driving mechanism continues in operation, and since the film is not passing the aperture plate with sufficient rapidity there is danger of ignition. I propose to eliminate the great danger occasioned through breakage by preventing the spread of the flame from the projection housing.

Some safety devices have been provided heretofore but they have not been effective in removing the above pointed out dangers. Some have employed a knife for cutting the film when fire starts within the projector housing, but even if this type of mechanism accomplishes its full purpose the dangers are not entirely removed. I propose to minimize the dangers to the greatest possible extent and at the same time leave the projecting mechanism in such condition that it may be operated in the customary manner, and in addition propose to provide mechanism which will stay in proper working order over a long period of time.

Other objects will appear hereinafter.

My invention may be best understood by reference to the accompanying drawings in which:

Fig. 3 is a detailed view taken substantially on line 3—3 of Fig. 1 and illustrates the shutter for the arc light housing and my mechanism for operating the same;

Fig. 4 is a detailed view taken substantially on line 4—4 of Fig. 2 and illustrates parts of the mechanism employed for closing the fire gates;

Fig. 5 is a detailed view taken substantially on line 5—5 of Fig. 2 and illustrates part of the mechanism employed for closing the lower fire gate;

Fig. 6 is a detailed view taken substantially on line 6—6 of Fig. 2 and illustrates part of the mechanism employed for breaking the projector driving circuit when fire breaks out within the projector housing.

Although my safety mechanism may be employed with many types of projectors, I have shown it attached to a machine somewhat diagrammatically illustrated.

Figure 1:
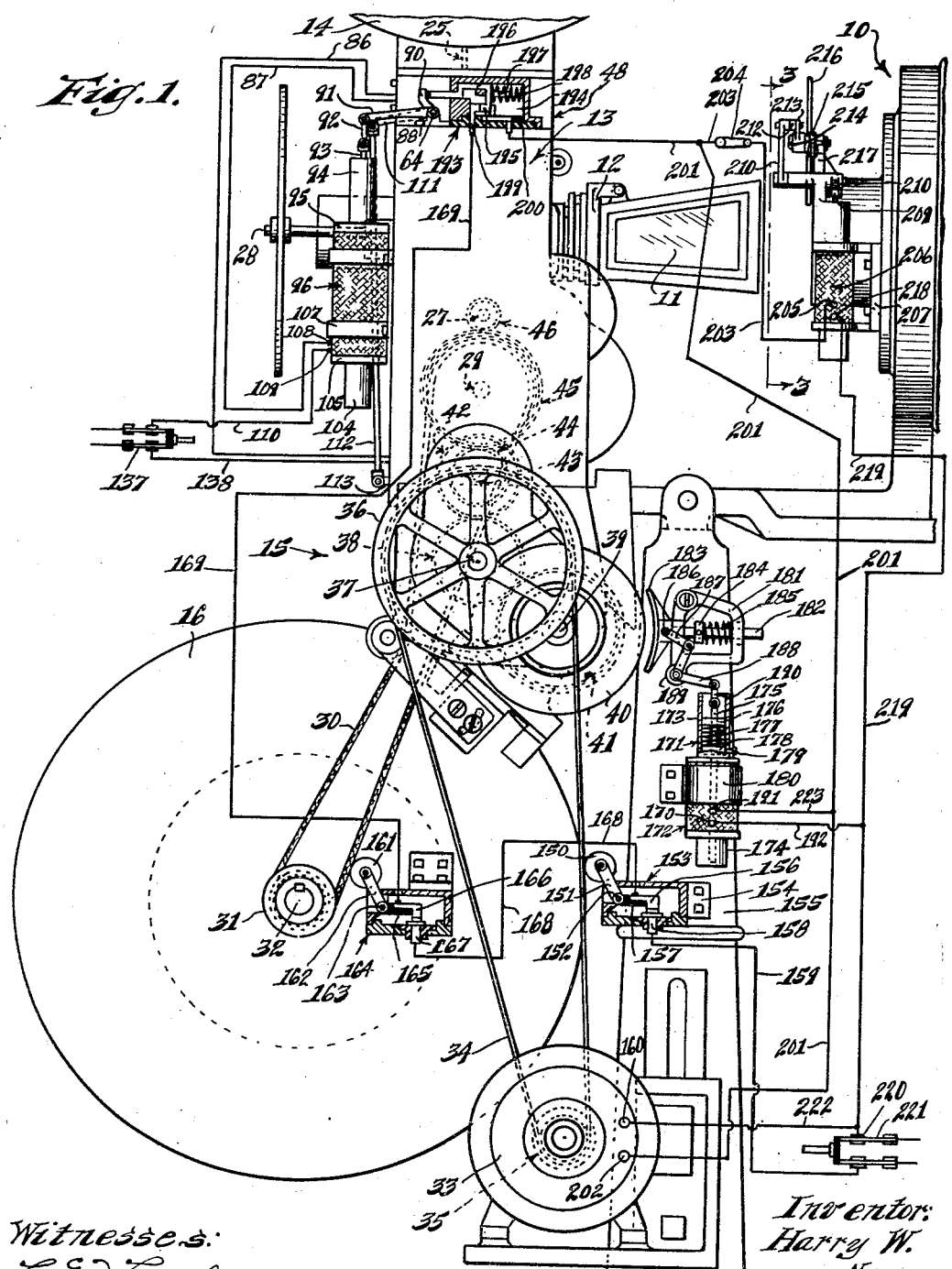
Fig. 1 is a side elevational view of the front portion of a projecting machine, viewing the device from the left side and illustrates part of my safety mechanism.

As can be seen from Fig. 1 the projecting machine shown comprises an arc light housing 10, an eye shield 11, aperture plate 12, main projector housing 13, feeding magazine 14, main power and driving mechanism 15, and take-up magazine 16.

Figure 2:
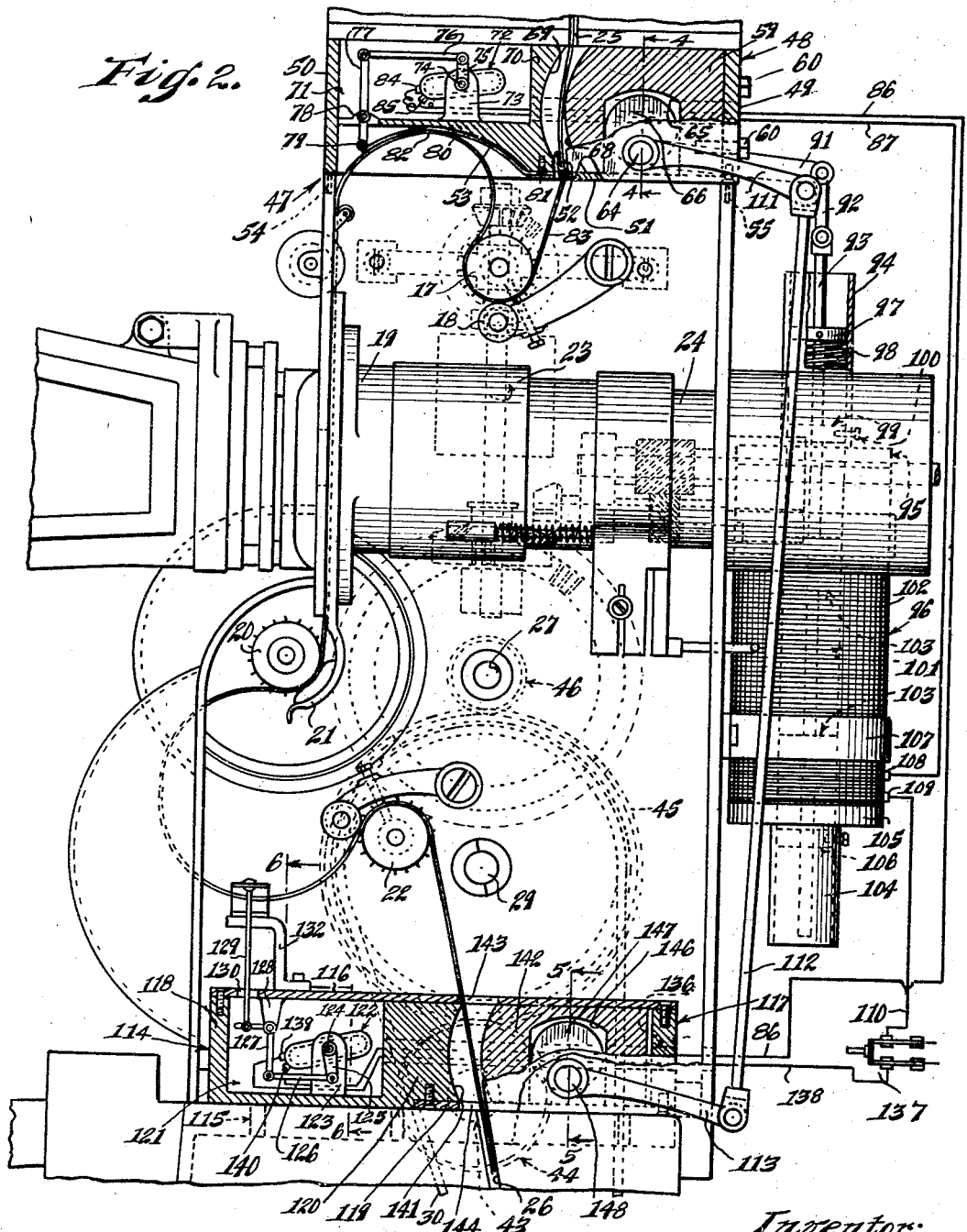
Fig. 2 is a side elevational view of the main projector housing viewed from the right hand side and illustrates the remaining parts of my safety mechanism; the side cover plate has been removed from the projector housing.

Referring now to Fig. 2, the interior of projector housing 13 contains feeding sprocket 17, locking roller 18, inner gate 19, intermittent sprocket 20, locking guide 21, take-up sprocket 22, housing sleeve 23, lens holder 24, feeding slot 25, and take-up slot 26. The main power shaft 27 transmits power to feeding sprocket 17, intermittent sprocket 20, and shutter shaft 28 through appropriate gear and shaft mechanism. Take-up shaft 29 is driven by take-up belt 30 and transmits power to take-up sprocket 22.

Referring now to Fig. 1, take-up belt 30 drives a pulley 31 which is keyed to a shaft 32 for the purpose of driving take-up magazine 16. Power is taken from a motor 33 by belt 34 from pulley 35, and belt 34 transmits power to pulley 36. Shaft 37 is keyed in pulley 36, and a gear 38 is keyed to shaft 37. A fly wheel shaft 39 has a fly wheel 40 and gear 41 keyed thereto. Gear 41 meshes with and is driven by gear 38, and gear 38 in turn drives gear 42 which is keyed to shaft 43. Gear 44 is keyed to shaft 43 and drives gear 45 which is keyed to shaft 29. Gear 45 then drives pinion 46 which is keyed to shaft 27 and cooperates with mechanism heretofore described for driving intermittent sprocket 20, feeding sprocket 17, and shutter shaft 28.

Referring now to Fig. 2, the upper end of projector housing 13 terminates as at 47 and has its upper wall cut away for part of its width for the reception of removable fire gate 48. Fire gate 48 has end walls 49 and 50, lower wall 51 having film slot 52, and the lower wall 51 also has an arcuate portion 53. The end walls 49 and 50 are provided with dowel pins 54 and 55 which seat securely in appropriate slots in the end walls of projectors housing 13. Referring now to Fig. 4, the bottom wall 51 is secured to side walls 56 and 57 by screws 58 and slidably supports a slidable block 59. End wall 49 is secured to side walls 56 and 57 by appropriate bolts 60 and thus limits longitudinal movement of block 59. The side wall 56 is provided with a longitudinal bore 61 for the reception of wiring later to be described, and side walls 56 and 57 are provided with appropriate transverse bores 62 so as to provide bearings for cam shaft 64. Block 59 is provided with an arch-shaped transverse cut away portion 65 which receives a transversely extending cam shaft 64 and cam 66. Spacing collars 67 space cam 66 centrally of block 59 and equidistant side walls 56 and 57. Referring again to Fig. 2, the inner end 68 of block 59 is arcuate in cross-section and adapted to conform exactly to the arcuate inner end 69 of stationary block 70. The outer end of block 70 which is above arcuate bottom wall 53 is cut away and provides open space 71 which is rectangular in cross-section and adapted to provide space for mercury switch 72. A switch bracket 73 is provided on the bottom wall of space 71 and pivotally receives a pin 74 which extends transversely out and supports mercury switch 72. The pin 74, however, is not pivotally mounted in regard to switch 72 and link 75 because it is necessary for link 76 to cause the rotation of switch 72 when link 76 is moved in a longitudinal direction. A vertical link 77 is pivoted to link 76 and also pivotally supported on the lower wall of space 72 by a bracket 78. Link 77 extends entirely through the lower wall of block 70 and is pivotally connected as at 79 to a strip of thermo-responsive metal 80 whose opposite end is secured by screw 81 to the lower face of block 70. The strip 80 substantially conforms in shape to the arcuate portion 53 and serves as a guide for the upper loop of film 83. Switch 72 has a pair of spaced contact members 84 and 85 to which wires 86 and 87 respectively are secured, and the said wires pass longitudinally through bore 61 in side wall 56.

The outer end of shaft 64 to the right, as shown in Fig. 4, is anchored in a bearing 88 which is secured to upper end wall 89 of projector housing 13, and a small arm 90 is keyed to said shaft. Between arm 90 and bearing 88 a second arm 91 is keyed to shaft 64 and extends substantially horizontally as can be seen clearly in Fig. 1 to a link 92 with which it is pivotally connected. Link 92 in turn is pivotally connected with a vertically extending rod 93 which is received in a vertical cylindrical sleeve 94 which is integral with a cap 95 secured to a solenoid generally indicated at 96. A collar 97 is pinned to rod 93 and serves as a stop for coil spring 98. The other end of coil spring 98 abuts against a stop 99 which is fixedly secured to sleeve 94 by a set screw 100. Rod 94 is slidably received by stop member 99 and extends inwardly of the solenoid bore 101. The solenoid is provided with appropriate windings 102, and a pair of cores 103 are fixed to rod 94. A lower sleeve 104 of cap 105 supports a guide 106 for rod 94. Insulated brackets 107 support the solenoid 96 on the front wall of projector housing 13. Terminals 108 and 109 are connected to wires 87 and 110 respectively. The opposite end of wire 110 is connected to one terminal of a manually operable switch 137.

The opposite end of shaft 64 as shown in Fig. 4 particularly and also in Fig. 2 has an arm 111 keyed thereto and extending in a substantially horizontal direction. A vertical connecting link 112 is pivotally connected to arm 111 at its upper end and pivotally connected to arm 113 at its lower end.

A lower fire gate 114 is removably received in the lower part of projector housing 13 and retained in place by dowel pins 115 in the lower wall of the projector housing. Fire gate 114 has an upper wall 116 as can be clearly seen in Fig. 2 and is secured to removable end wall 117 by appropriate screws and also secured to stationary end wall 118 in the same manner. A removable lower wall 119 is secured to stationary block portion 120 and to removable end wall 117 by appropriate screws. Stationary block portion 120 is cut away to provide space 121 for mercury switch 122. A bracket 123 is secured to the lower wall of space 121 and supports switch 122 by a pivot pin 124. Pin 124 is not pivotally mounted as to switch 122 or arm 125 for the rocking motion of arm 125 by a pivotally connected link 126 must cause the rocking of switch 122 on the axis of pin 124. A bell crank 127 has one leg thereof pivotally connected to link 126, and the bell crank 127 is pivoted to a depending bracket 128 mounted on the lower face of upper wall 116. The horizontal leg of bell crank 127 is pivotally connected to a vertically extending link 129 which extends through an appropriate opening 130 in upper wall 116. The upper end of link 129 is secured to one end of a substantially U-shaped piece of thermo-responsive metal 131 whose side members lie in horizontal planes as can be clearly seen in Fig. 6. The lower side member of member 131 is secured to a vertical bracket 132 which is attached to the upper wall 116. As can be clearly seen from Figs. 2 and 5 the stationary block portion 120 is substantially U-shaped in plan section at the end opposite the space 121, and thus it provides longitudinally extending side walls 133 and 134. Wall 133 has a longitudinal bore 135 which communicates with an aperture 136 in removable end wall 117. Wires 86 and 138 are received through aperture 136 and extend through bore 135 to space 121 where they are connected to the contacts 139 and 140 of switch 122. The opposite end of wire 138 is secured to one terminal of a manually operable switch 137 whose opposite terminal is connected to one wire of the main power line. Substantially centrally of block 120 and between longitudinally extending side walls 133 and 134 is provided a vertically extending arcuate transverse wall 141 from which a slidable block 142 is spaced as shown in Fig. 2. The inner end wall of slidable block 142 is arcuate in cross-section and meshes precisely with the arcuate wall 141 of stationary block 120. The upper plate 116 is provided with a transverse slot 143, and the lower wall 119 is provided with a slot 144, and film 83 passes through slot 143 between slidable block 142 and arcuate wall 141, and thence through slot 144 to take-up slot 26. The spaced side walls 133 and 134 provide a longitudinal slot 145 for block 142. Block 142 has a vertical arch-shaped slot 146 in which a cam 147 operates. As can be seen clearly in Fig. 5 cam 147 is keyed to transverse shaft 148 whose ends bear in appropriate bores in side walls 133 and 134 of stationary block 120. Spacing collars 149 keep cam 147 spaced centrally in slot 145. The outer left end of shaft 148 as seen in Fig. 5 has arm 113 keyed thereto, and as before stated the opposite end of arm 113 is pivotally connected to link 112.

Referring now to Fig. 1, an idling roller 150 rides on belt 34 and is pivotally connected to a yoke 151 whose lower end is keyed to transverse pin 152 which extends between the vertical side wall of a switch box 153. Switch box 153 is secured by bracket 154 to supporting frame 155. Interiorly of switch box 153 an L-shaped contact member 156 is secured to insulating material 157 which in turn is keyed to transverse pin 152. A stationary contact member 158 is secured to the bottom wall of switch box 153 and has a wire 159 connected thereto. The opposite end of wire 159 is connected to one terminal post of the main line switch 221.

A similar idler roller 161 rides on take-up belt 30 and is pivotally mounted in a yoke 162. The lower end of yoke 162 is keyed to pin 163 whose ends are pivoted in the side walls of a switch box 164. A piece of insulating material 165 is also keyed to pin 163 and has an L-shaped contact member 166 secured thereto for contact with lower contact member 167. Wire 168 is connected to contact 167 and contact 156.

Solenoid 171 comprises a winding 172, cap sleeves 173 and 174, and a rod 175 is slidably received in sleeves 173 and 174. A guide collar 176 is pinned to rod 175 and acts as a stop member for a spring 177. A movement-limiting guide collar 178 is securely fixed to sleeve 173 by set screw 179 and acts as a stop abutment for compression spring 177. A pair of cores are mounted on rod 175 and are similar to cores 103. An attaching strap bracket 180 encircles winding 172 and is fixed on supporting frame 155.

Above solenoid 171 a magnetic brake frame 181 is fixed on supporting frame 155 and is somewhat rectangular in form. Between its opposite vertical sides and slidably mounted in bearings in said side members is a brake shaft 182 carrying a brake shoe 183 for action on fly wheel 40. A stop collar 184 is pinned to shaft 182 between vertical side members of frame 181 and acts as an abutment for a compression spring 185. The opposite end of spring 185 abuts against one of the side members of frame 181 and serves to urge brake shaft 182 to the left as shown in Fig. 1. Outside the limits of frame 181 a pivot pin 186 extends transversely through shaft 182 and supports a link 187. The opposite end of link 187 is pivotally connected with the upper leg of a bell crank 188 whose knee is pivoted to a depending bracket 189 carried by frame 181. The lower leg of bell crank 188 is pivotally connected to a link 190 whose opposite end is pivoted on rod 175.

The upper throw-out switch 193 comprises a housing 194, slidable contact member 195 actuating rod 196 carrying horizontally extending spring guide 197 and compression spring 198. The actuating rod 196 has an offset portion which seats against one side wall of switch box 194 and also has a vertically extending off-set portion adjacent spring guide rod 197 for the seating of spring 198. The protruding end of rod 196 extends to a point adjacent arm 90 mounted on shaft 64 and is in position to be moved horizontally by the movement of arm 90. The opposite end of spring 198 seats against the opposite side wall of switch box 194. A lower contact member 199 extends vertically and has an offset contact head with which contact 195 contacts when spring 198 urges rod 196 outwardly of housing 194. A contact plate 200 is mounted beneath contact 195, and said contact 195 is adapted to slide over plate 200 and close a circuit between said plate and contact member 199. The wire 169 electrically connects contact 199 and terminal 166 of switch 164. A wire 201 electrically connects plate 200 to terminal 202 of motor 33. Between contact plate 200 and motor 33, however, a shutter operating wire is interposed.

A wire 203 is connected with wire 201 and electrically connects terminal 205 of solenoid 206 to contact plate 200 through wire 201. A switch 204 is interposed electrically between wire 201 and terminal 205. The solenoid 206 is supported by suitable bracket 207 mounted on front of arc light housing 10, and the construction of the solenoid is analogous to that of solenoid 171 and solenoid 96. The upper end of its actuating rod 208 is pivotally connected to link 209 whose opposite end is pivotally connected to the lower end of the offset bell crank 210. The knee of bell crank 210 is pivoted on vertical bracket 211, and the upper leg of the bell crank is pivotally connected to the connecting link 212. The opposite end of link 212 is pivoted on an arm 213 which is in turn keyed to a pin 214. Pin 214 passes through an appropriate aperture in a lug 215 carried by disc-like shutter 216 and has its opposite end pivoted in shutter carrying bracket 217 on the front of arc light housing 10. The pin 214 is also keyed to the lug 215 so that rotational movement of the pin 214 will carry with it shutter 216. The other contact member 218 of solenoid 206 is connected by wire 219 to terminals 220 of main knife switch 221 in the main power line. Wire 192 connects wire 219 to terminal 170 of solenoid 171, and wire 222 connects wire 219 to terminal 160 of motor 33. Wire 223 connects wire 201 to terminal 191 of solenoid 171.

The operation of the device will now be set out in detail. When the operations for the day are over, switches 137 and 221 are opened, and thus current is disconnected from motor 33 and all the rest of the mechanism shown particularly in Fig. 1 and all the mechanism shown particularly in Fig. 2. When switch 221 is opened the magnetic force of solenoid 171 is of course removed and compression spring 177 acts against collar 176 to force rod 175 vertically against bell crank 188, link 187, and brake shaft 182, and the tension of compression spring 185 against stop collar 184 causes brake shoe 183 to be applied to fly wheel 40 in order to stop the driving mechanism connected with fly wheel 40. At the same time a similar action occurs in regard to solenoid 206, and rod 208 is moved vertically as shown in Fig. 8 by the action of its compression spring against its lower stop collar, and rod 208 pushes upwardly on link 209 and the lower leg of bell crank 210 to cause link 212 to be moved to the left and carry with it arm 213 and shutter 216. The shutter 216 closes the arc light opening and prevents the arc light from shining through its opening.

On the other side of the machine as shown particularly in Fig. 2 the opening of switch 137 causes solenoid 96 to be demagnetized, and compression spring acting against collar 97 forces rod 93 upwardly to impinge against link 92 and force arm 91 upwardly. Since arm 91 is keyed to shaft 64 and cam 66 is likewise keyed thereto, the eccentric part of the cam will be forced to the left as shown in Fig. 2. The force of the eccentric portion of cam 66 against the left side wall of arch-shaped opening 65 will cause slidable block 59 to move to the left and cause its inner arcuate end 68 to come in close contact with the similar arcuate wall member 70 and close the exit from the projector housing 13. The film 83 at this time is pressed very tightly between member 59 and member 70, and there is no danger of a spreading of fire from the projector housing 13.

To the opposite end of crank shaft 54 is keyed the arm 111 which moves upwardly as arm 91 moves upwardly and carries with it link 112 which raises arm 113. The arm 113 is keyed to shaft 148, and the rotation of shaft 148 as seen in Fig. 2 in a counter-clockwise direction causes movable block 142 to slide to the left and close the opening from the lower wall of the projector housing in a manner analogous to that explained in regard to the upper fire gate.

When switches 137 and 221 are closed the solenoids 96, 206, and 171 are energized, and the movements are in the reverse direction. If the switches just described are closed and fire should break out within the projector housing and heat thermo-responsive strip 80, it will expand as shown in Fig. 2 and cause vertical link 77 to rotate in a clockwise direction and cause the mercury in switch 72 to move to the opposite end from contacts 84 and 85 and break the circuit to solenoid 96. When this happens the upper fire gate and lower fire gate will be closed, and the upward movement of arm 91 will cause arm 90 as shown particularly in Fig. 1 to move to the right against actuating rod 196 and thus break the circuit between contact 199 and plate 200. Then solenoids 171 and 206 will be deenergized, the brake applied to the fly wheel, and the shutter 216 closed. Likewise, the entire driving circuit is broken, and the driving mechanism will of course stop. An analogous operation occurs if the lower loop of film 83 passing through U-shaped thermo-responsive metal strip 131 becomes ignited and causes link 129 to be drawn upwardly so as to cause the mercury to leave the contacts 139 and 140.

If belt 30 should break, the idling roller 161 will descend by gravity and raise contact 166 from contact 167 and break the circuit from the main switch 221 through wire 159, switch 153, and wire 168 to wire 169. When the circuit through switch 164 is broken, solenoids 206 and 171 are deenergized, the magnetic brake applied, and a shutter placed over the opening from arc light housing. However, if belt 34 breaks, roller 150 on yoke 151 descends by gravity and breaks the circuit from switch 221 through switch 153 to wire 168 by raising contact member 156 from contact member 157. When this occurs, solenoids 171 and 206 are deenergized, the brake applied, and the shutter closed, as above explained in connection with switch 164.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. Projecting mechanism comprising a projector housing having a film entrance slot and a film exit slot, fire gates adjacent each of said slots, said fire gates each comprising a fixed block and a slidable block adapted to firmly clamp the interposed portion of the film between them, mechanism for driving film through said housing, cams for actuating said slidable blocks to close the film slots in said housing, means for stopping said driving mechanism, and means responsive to heat within said housing for causing the actuation of said cams for closing said openings in said housing and also for actuating said means for stopping said driving mechanism.

2. In projecting mechanism having driving mechanism therefor including a driving belt, a combination of means in contact with said driving belt, with means for causing the stopping of said driving mechanism when said driving belt is broken, said last mentioned means comprising a brake adapted to be set when said driving belt is broken.

3. In projecting mechanism having driving mechanism therefor including a driving belt, a combination of means in contact with said driving belt, with means for causing the stopping of said driving mechanism when said driving belt is broken, said last mentioned means comprising a brake adapted to be set when said driving belt is broken, and electro-magnetic means wired in series with the driving motor of said driving mechanism for maintaining said brake in a released position.

4. A device as set forth in claim 1 in which the blocks forming the fire gates are of considerable thickness and their cooperating faces are concave and convex respectively, substantially as described.

5. In a projecting mechanism, a main housing having a film slot, film actuating mechanism, a fire gate adjacent said film slot and adapted to be closed upon failure of the film actuating mechanism or ignition of the film, said fire gate comprising a fixed block and a slidable block, a cam for moving the movable block, spring actuated means for actuating said cam, a solenoid normally holding said cam actuating mechanism retracted and adapted to release the same upon de-energization of the solenoid, and a thermostatically actuated switch for breaking the circuit to said solenoid.

6. A device as set forth in claim 5 further characterized by means actuating said gate closing mechanism for breaking the circuit to the film feeding mechanism, substantially as described.

7. In a projecting mechanism, a main housing having a film inlet slot and a film exit slot, film actuating mechanism, a fire gate adjacent each of the film slots and adapted to close upon failure of the film actuating mechanism or ignition of the film, said fire gates each comprising a fixed block and a sliding block adapted when actuated to clamp the interposed portion of the film between them, a cam for actuating each of said slidable blocks, spring actuated mechanism for actuating one of said cams, a solenoid normally holding said cam actuating mechanism retracted and adapted to release the same upon de-energization of the solenoid, a thermostatically actuated switch for breaking the circuit to said solenoid, and a connection between said cams whereby the actuation of one cam will cause the actuation of the other, substantially as described.

HARRY W. NEPO.